Jan. 31, 1956
P. F. BAUER ET AL
2,733,362
SYNCHRONOUS INDUCTION MOTOR HAVING A SEGMENTED
ROTOR AND SQUIRREL CAGE WINDING
Filed Dec. 13, 1954
2 Sheets-Sheet 1
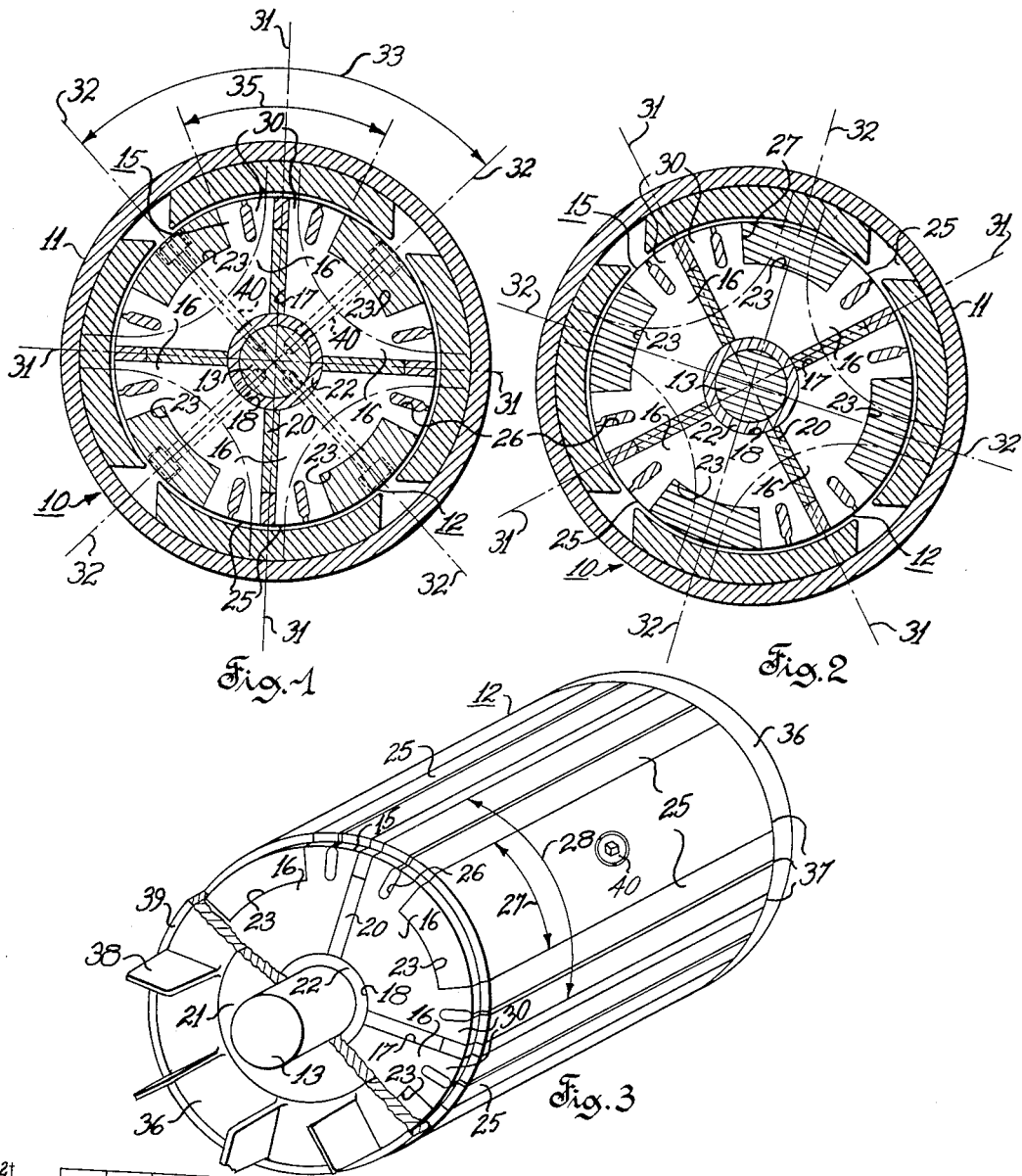
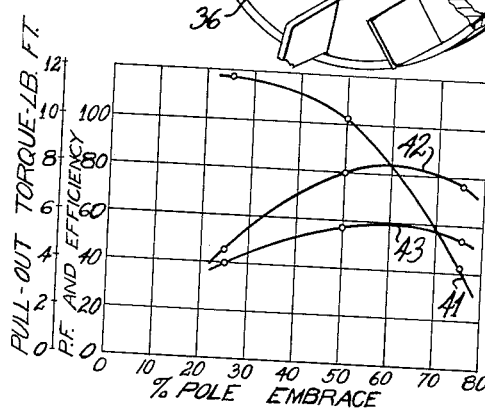
Inventors
Phillip F. Bauer
Vernon B. Honsinger
by John Stevens Lieb
Attorney Jan. 31, 1956 P. F. BAUER ET AL 2,733,362
SYNCHRONOUS INDUCTION MOTOR HAVING A SEGMENTED
ROTOR AND SQUIRREL CAGE WINDING
Filed Dec. 13, 1954
2 Sheets-Sheet 2
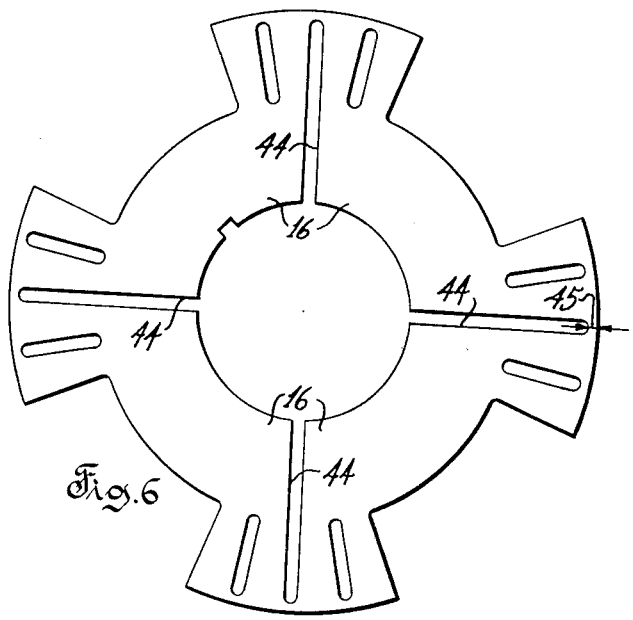
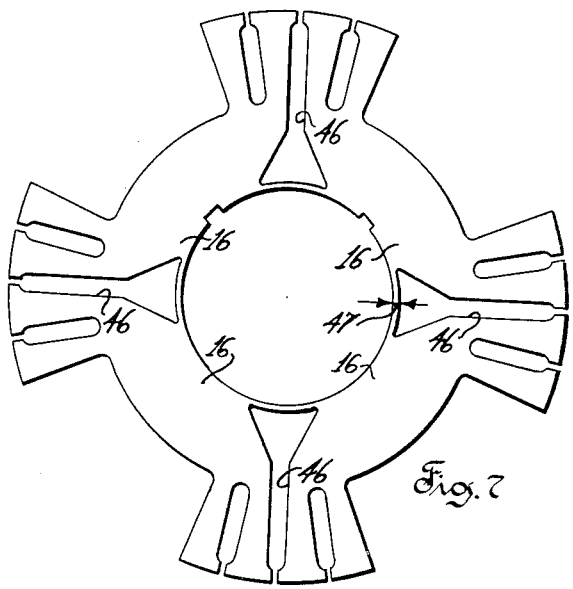
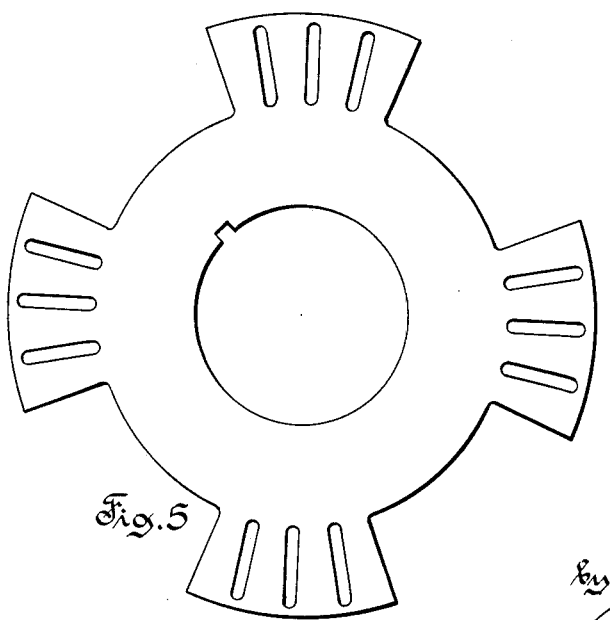
Inventors
Phillip F. Bauer
Vernon B. Honsinger
by John Stevens Lieb
Attorney

United States Patent Office 2,733,362
Patented Jan. 31, 1956

2,733,362

SYNCHRONOUS INDUCTION MOTOR HAVING A SEGMENTED ROTOR AND SQUIRREL CAGE WINDING

Phillip F. Bauer and Vernon B. Honsinger, Cincinnati, Ohio, assignors to Allis-Chalmers Manufacturing Company, West Allis, Wis.

Application December 13, 1954, Serial No. 474,694

6 Claims. (Cl. 310—162)

This invention relates generally to an improved synchronous induction motor. More specifically this invention relates to a synchronous induction motor having a rotor construction resulting in improved operating characteristics for the motor.

Reluctance motors known to the art today accelerate to full speed on the induction principle, utilize the pull-in torque of an unexcited synchronous machine as the principal driving force, and run at synchronous speed. These motors are generally characterized by very low power factors or efficiencies or both. As a result reluctance motors are larger than induction motors of corresponding rating.

Reluctance motors in the prior art used rotors that had sections of their periphery removed to form salient poles. Some reluctance motors used deep slots in the rotor to control the flux path in the rotor. However, a synchronous induction motor equipped with a completely segmented rotor, having essentially rectangular axially extending grooves at its circumference, has operating characteristics that far surpass the operating characteristics of any reluctance motor of the same rating used in the prior art. Those characteristics are power factor, efficiency, pull-out torque and pull-in torque. The improved combination of operating characteristics resulting from the incorporation of this rotor in the motor makes it possible to build a synchronous induction motor in a much smaller frame than the frames used in the art today on reluctance motors of the same rating.

This small frame plus the use of slots on the rotor and a conventional induction motor stator makes this motor more economical and easier to manufacture than corresponding reluctance motors of the same rating.

Therefore it is the object of this invention to provide a synchronous induction motor that is smaller, more economical and easier to manufacture than corresponding reluctance motors of the same rating used in the art today.

Another object of this invention is to provide an improved synchronous induction motor having a combination of operating characteristics namely pull-out torque, efficiency and power factor superior to a combination of like characteristics of a prior art reluctance motor of the same rating.

Objects and advantages other than those set forth above will be apparent from the following description when read in connection with the accompanying drawings, in which:

Fig. 1 is a cross sectional view of the preferred embodiment of the motor taken in a plane perpendicular to the axis of rotation of the shaft and showing the direct axis flux path;

Fig. 2 is a cross sectional view of the motor of Fig. 1 with the rotor in a different position to show the quadrature axis flux path;

Fig. 3 is a pictorial view of the rotor with part of the end disk and end ring removed;

Fig. 4 is a graph showing how the power factor, efficiency and pull-out torque vary with the changing pole embrace of the rotor;

Fig. 5 is a view of a modified form of a rotor lamination which is nonsegmented;

Fig. 6 is a view of a modified form of a rotor lamination in which the segments are connected at the outer edge of the radial slots; and Fig. 7 is a view of a modified form of a rotor lamination in which the segments are connected at the inner edge of the radial slots.

As shown in the drawings the synchronous induction motor 10 has a stator 11 of the type used in a standard induction motor, a rotor 12 rotatable relatively to the stator 11, and a shaft 13 on which the rotor 12 is mounted.

The rotor 12 consists of a cylindrical magnetic core 15 preferably laminated which is divided into a plurality of circumferentially spaced segments 16 by radial dividing slots 17 and a bore 18. Nonsegmented laminations as shown in Fig. 5 may be interspersed periodically in the laminated magnetic core 15 to aid in securing the segments 16 together. The dividing slots 17 extend from the bore 18 to the periphery of the core and may be filled with any suitable nonmagnetic electrically conducting material. But preferably as shown the radial dividing slots 17 are provided with nonmagnetic spacers 20 preferably of brass in the inner portion of the dividing slots 17 and the remaining space is filled with aluminum. The spacers 20 are connected at each end of the rotor 12 by a disk 21 of brass or other metallic substance. The shaft 13 may be made of magnetic or nonmagnetic material such as stainless steel. If the shaft 13 is made of magnetic material then a nonmagnetic sleeve 22 preferably of brass is fitted between the shaft 13 and the bore 18 of the magnetic core 15 to magnetically isolate the shaft 13 from the segments 16 of the magnetic core 15 and to combine with the radial dividing slots 17 to magnetically isolate the segments 16 from each other. An axially extending groove 23 of substantially uniform depth is cut into the cylindrical surface 25 of each of the segments.

The depth of the grooves 23 is sufficient to substantially minimize the quadrature axis flux. In the preferred embodiment as shown the depth of the grooves 23 is equal to the depth of the winding slots 26. The circumferential length 27 of the grooves 23 may be made to equal from 45% to 55% of the circumferential length 28 of the segments 16, but preferably as shown the circumferential length 27 of the grooves 23 is equal to substantially 50% of the circumferential length 28 of the segment 16. Adjacent grooves 23 define salient poles 30 therebetween that are uniformly spaced with a radial dividing slot 17 bisecting each salient pole 30. The radial dividing slots 17 lie in the direct axes 31 of air gap flux and the axial grooves 23 lie in the quadrature axes 32 of air gap flux with each groove 23 located symmetrically with respect to a quadrature axis 32.

The circumferential length of the rotor between adjacent quadrature axes 32 is the pole pitch 33. The pole embrace 35 is the circumferential length of the salient pole 30. The percent pole embrace of the rotor is the pole embrace divided by the pole pitch multiplied by one hundred.

The salient portions of the segments 16 form salient poles 30 and are provided with axially extending winding slots 26 along the periphery. These winding slots 26 and the axial grooves 23 are filled with a nonmagnetic electrically conducting material and are interconnected with each other and the dividing slots 17 at the ends of the rotor 12 by rings 36 to form a squirrel cage winding 37. The rings 36 are made of the same material as the bars in grooves and slots and are fitted over the disks 21 that connect the nonmagnetic spacers 20. Fan blades 38 may be die cast integrally with the rings 36. The winding 37 causes the motor 10 to have the good starting characteristics of an induction motor. Also the motor with this winding 37 has good synchronous characteristics.

The best method of making this rotor 12 is to fill the dividing slots 17, winding slots 26 and axial grooves 23 with the same nonmagnetic electrically conducting material, preferably aluminum. Then the rotor can be die cast in a single operation with the aluminum disposed around the laminated core segments 16 to form a cylindrical rotor thereby reducing to a minimum the windage losses of the motor.

For high speed operation of the motor the rotor 12 may be secured together with nonmagnetic bands 39 and the segments 16 may be secured to the shaft 13 by nonmagnetic bolts 40.

This motor is designed to give a high pull-out torque while the power factor and efficiency remain near their respective maximums. This is illustrated by the graph in Fig. 4 in which the pull-out torque 41, efficiency 42 and power factor 43 are plotted against the percent pole embrace of the rotor. The pull-out torque of the motor is a function of the direct axis reactance and the quadrature axis reactance of the magnetic circuit. The pull-out torque (P. O.) is proportional to a constant ($k$) times the difference between the reciprocal of the quadrature axis reactance ($x_q$) and the reciprocal of the direct axis reactance ($x_d$):

$$P.\ O. = k\left(\frac{1}{x_q} - \frac{1}{x_d}\right)$$

To get a maximum pull-out torque the quadrature axis reactance must be reduced to a minimum while maintaining the direct axis reactance near its maximum. The reactance is proportional to the flux. Therefore to approach a minimum quadrature axis reactance quadrature axis flux must be reduced to a minimum. The quadrature axis flux of a rotor can be reduced by increasing the reluctance in the rotor flux path. The axial grooves 23 and radial dividing slots 17 in this rotor 12 increase the reluctance in the quadrature axis flux path and therefore decrease the quadrature axis flux. Hence the quadrature axis reactance is decreased. The direct axis flux is not materially affected by either the dividing slots 17 or the axial grooves 23. Therefore the direct axis reactance remains about the same.

Because of the axial grooves 23 and dividing slots 17 in the rotor 12, the difference between the direct axis reactance and the quadrature axis reactance of the motor is increased. Hence the pull-out torque is increased.

The circumferential length of the axial grooves 23 is chosen so that the motor runs at near its maximum power factor and efficiency and still has a high pull-out torque. In this rotor 12 it is necessary to make the circumferential length of the axial grooves 23 equal to 45% to 55% of the circumferential length of the segments 16 to effect a synchronous induction motor with the combination of operating characteristics necessary for successful commercial operation.

In the modified lamination illustrated in Fig. 6, the segments 16 are joined at the outer end of the dividing slot 44 by magnetically saturable bridges 45. Such an arrangement permits the laminations to be made in one piece which increases the mechanical strength of the rotor but does not materially affect the operating characteristics of the motor.

In the modified lamination illustrated in Fig. 7, the segments 16 are joined at the end of the dividing slot 46 adjacent the shaft by magnetically saturable bridges 47. In this modification the dividing slot flares as it approaches the magnetically saturable bridge 47 thereby increasing the reluctance across the dividing slot 46 to compensate for the decrease in reluctance due to the magnetically saturable bridge 47 across the dividing slot 46. By flaring the dividing slot 46 as it approaches the bore of the rotor, the length of the bridge 47 across the dividing slot at the bore of the rotor is increased. There is greater reluctance through the long narrow bridge 47 connecting the segments by bridging the flared radial slot than there would be through a shorter bridge that would bridge a radial slot that is not flared. Hence the reluctance across the dividing slot is further increased due to the use of the flared dividing slot rather than a straight dividing slot. A lamination having segments that are connected together by bridges can be made in one piece and such a structure gives the rotor greater mechanical strength.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. A synchronous induction motor comprising a stator, a rotor rotatable relatively to said stator, said rotor comprising a cylindrical magnetic core having a plurality of circumferentially spaced segments separated by radial dividing slots, said segments having axially extending winding slots, the cylindrical surface of each of said segments having an axially extending groove of uniform depth substantially equal to the depth of said winding slots, the circumferential length of said groove being substantially equal to 50% of the circumferential length of said segment, said grooves and slots being filled with a nonmagnetic electrically conducting material and interconnected with each other at the ends of the rotor to form a cylindrical rotor with a squirrel cage winding.

2. A synchronous induction motor comprising a stator, a rotor rotatable relatively to said stator, said rotor comprising a cylindrical magnetic core having a plurality of segments separated by radial dividing slots, the cylindrical surface of each of said segments having salient portions separated by an axially extending groove symmetrical with respect to the quadrature axis and of uniform depth sufficient to substantially minimize the quadrature axis flux, the circumferential length of said groove being 45% to 55% of the circumferential length of said segment, axially extending winding slots in the said salient portions of said segments, said grooves and slots being filled with a nonmagnetic electrically conducting material and interconnected with each other at the ends of the rotor to form a cylindrical rotor with a squirrel cage winding.

3. A synchronous induction motor comprising a stator, a rotor rotatable relatively to said stator, said rotor comprising a cylindrical magnetic core, said core being divided into segments by radial dividing slots and a bore, said dividing slots extending from the bore to the periphery of said core to separate said segments from each other, said segments having axially extending winding slots, a shaft on which said rotor is mounted, a sleeve of nonmagnetic material fitted between said shaft and said bore to magnetically isolate said shaft from said segments, the cylindrical surface of each of said segments having an axially extending groove of uniform depth equal to the depth of said winding slots, the circumferential length of said groove being substantially equal to 50% of the circumferential length of said segment, said grooves and slots being filled with a nonmagnetic electrically conducting material and interconnected with each other at the ends of the rotor to form a cylindrical rotor with a squirrel cage winding.

4. A synchronous induction motor comprising a stator, a rotor rotatable relatively to said stator, said rotor comprising a cylindrical magnetic core, said core being divided into segments by radial dividing slots and a bore, said dividing slots extending from the bore to the periphery of said core to separate said segments from each other, said segments having axially extending winding slots, a shaft on which said rotor is mounted, a sleeve of nonmagnetic material fitted between said shaft and said bore to magnetically isolate said shaft from said segments, the cylindrical surface of each of said segments having an axially extending groove symmetrical with respect to the quadrature axis and of uniform depth sufficient to substantially minimize the quadrature axis flux, the circumferential length of said groove being 45% to 55% of the circumferential length of said segment, said grooves and slots being filled with a nonmagnetic electrically conducting material and interconnected with each other at the ends of the rotor to form a cylindrical rotor with a squirrel cage winding.

5. A synchronous induction motor comprising a stator, a rotor rotatable relatively to said stator, said rotor comprising a cylindrical magnetic core, said core being divided into segments by radial dividing slots and a bore, said dividing slots extending from said bore to the periphery of said core to separate said segments from each other, brass spacers disposed in and partially filling said slots, said segments having axially extending winding slots, a shaft on which said rotor is mounted, a brass sleeve fitted between said shaft and said bore to magnetically isolate said shaft from said segments, the cylindrical surface of each of said segments having an axially extending groove of uniform depth equal to the depth of said axially extending winding slots and symmetrically positioned with respect to the quadrature axis to substantially reduce the quadrature axis flux thereby rendering the quadrature axis reactance to a minimum, the circumferential length of said groove being 45% to 55% of the circumferential length of said segment, said grooves and slots being filled with bars of nonmagnetic electrically conducting material, and conductive rings interconnecting said bars at the ends of the rotor to form a cylindrical rotor with a squirrel cage winding.

6. A synchronous induction motor comprising a stator, a rotor rotatable relatively to said stator, said rotor comprising a cylindrical magnetic core, said core being divided into segments by radial dividing slots and a bore, each of said dividing slots extending from the periphery of said core to said bore and flaring out as said dividing slot approaches said bore, magnetically saturable bridges for connecting said segments, each of said bridges extending across the flared portion of one of said dividing slots adjacent said bore, nonmagnetic spacers disposed in and partially filling said dividing slots, said segments having axially extending winding slots, a shaft on which said rotor is mounted, a nonmagnetic sleeve fitted between said shaft and said bore to magnetically isolate said shaft from said segments, the outer cylindrical surface of each of said segments having an axially extending groove of uniform depth equal to the depth of said axially extending winding slots and symmetrically positioned with respect to the quadrature axis to substantially reduce the quadrature axis flux thereby rendering the quadrature axis reactance to a minimum, the circumferential length of said groove being 45% to 55% of the circumferential length of said segment, said grooves and slots being filled with bars of nonmagnetic electrically conducting material, and conductive rings interconnecting said bars at the ends of the rotor to form a cylindrical rotor with a squirrel cage winding.

No references cited.